Dec. 1, 1970 V. YAGER 3,543,399
SAFETY RAZOR WITH ENDLESS BAND BLADE
Filed Sept. 24, 1968 4 Sheets-Sheet 1
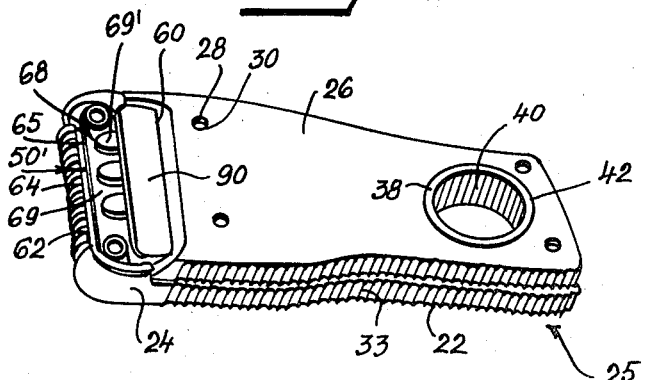
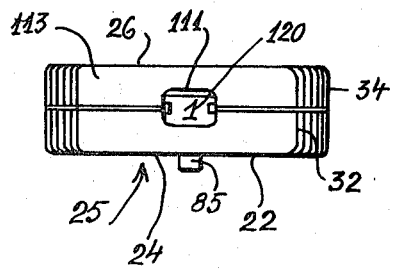
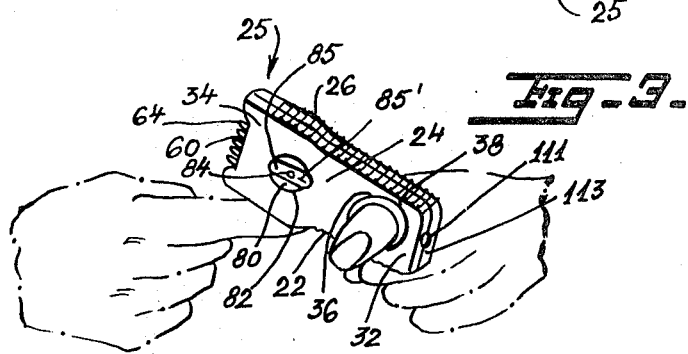
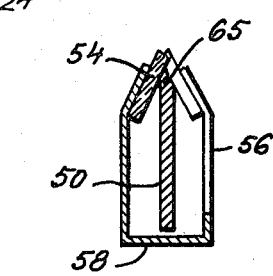
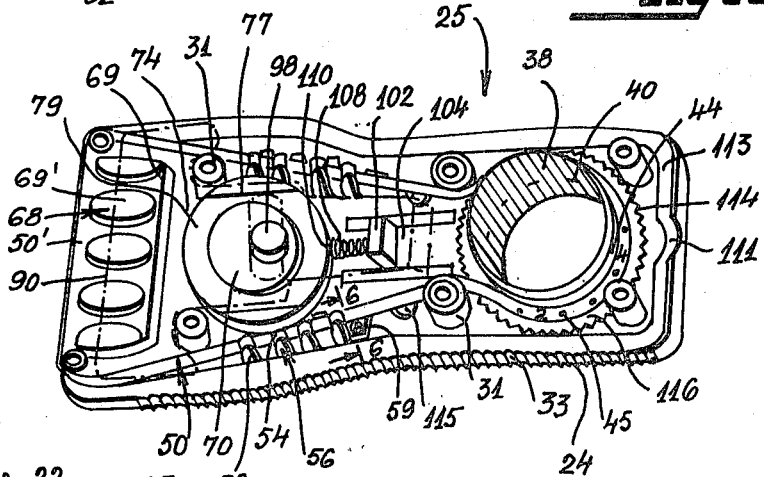
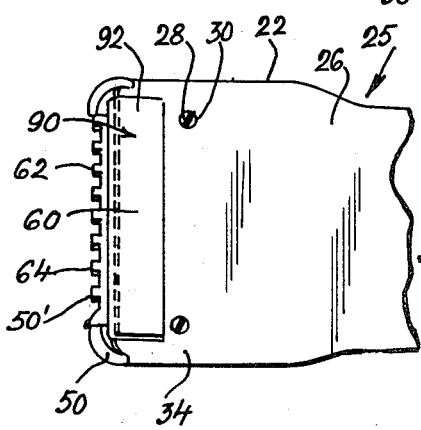
INVENTOR
Victor Yager
BY Polachek & Saulsbury
ATTORNEYS

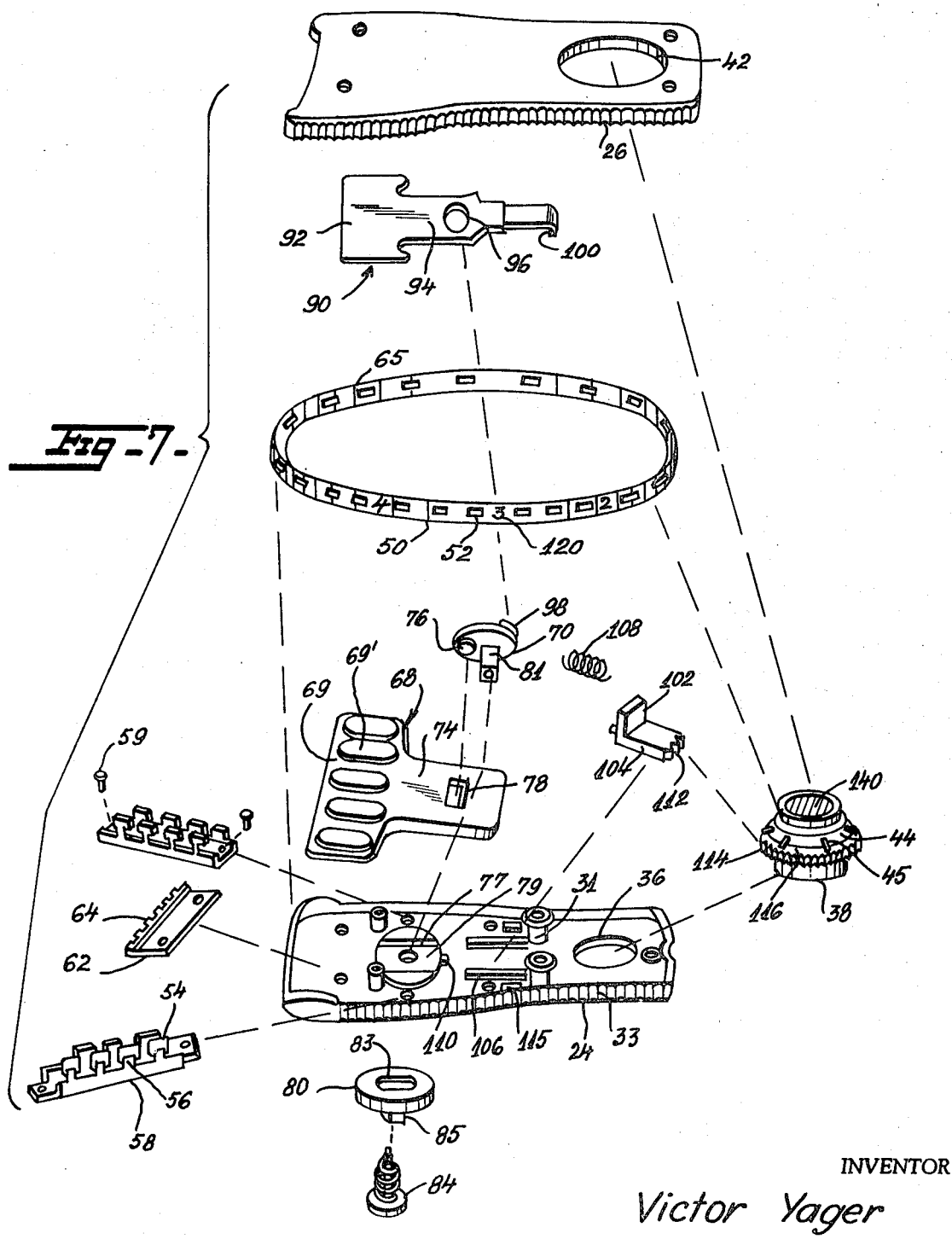

Dec. 1, 1970  V. YAGER  3,543,399
SAFETY RAZOR WITH ENDLESS BAND BLADE
Filed Sept. 24, 1968  4 Sheets-Sheet 3
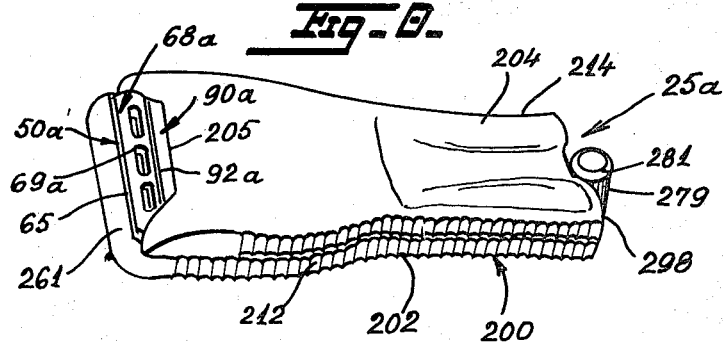
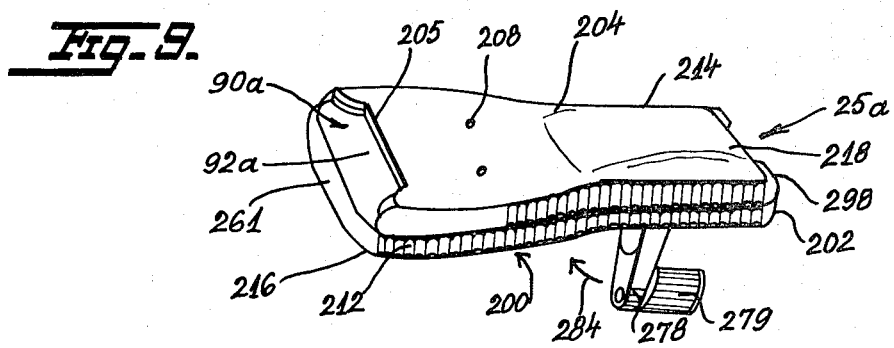
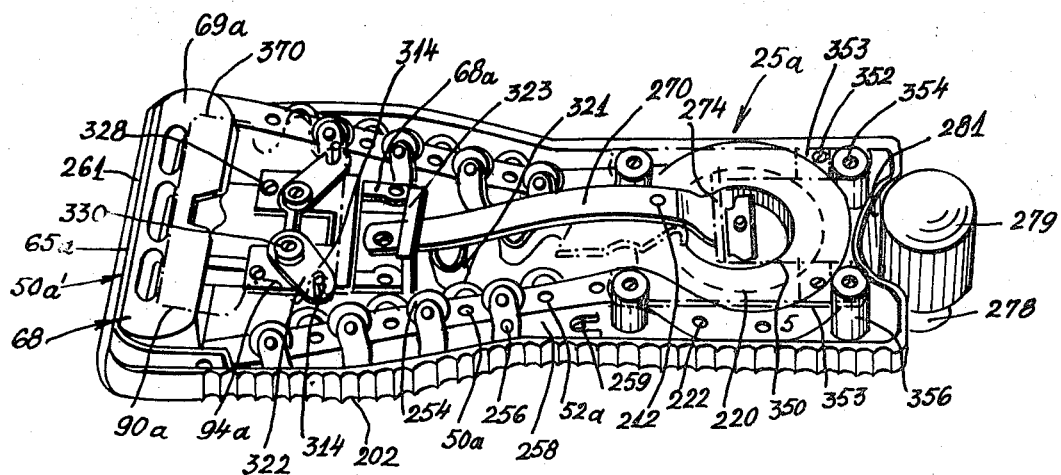
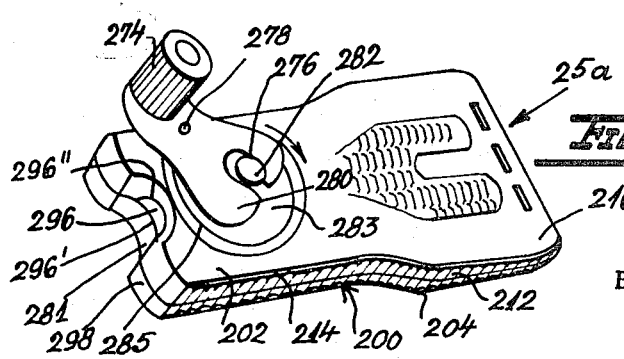
INVENTOR
Victor Yager
BY Polachek & Saulsbury
ATTORNEYS United States Patent Office 3,543,399
Patented Dec. 1, 1970

3,543,399
SAFETY RAZOR WITH ENDLESS BAND BLADE
Victor Yager, 2712 Ditmars Blvd.,
Astoria, N.Y. 11105
Filed Sept. 24, 1968, Ser. No. 761,913
Int. Cl. B26b 21/26
U.S. Cl. 30—40.1                          10 Claims

ABSTRACT OF THE DISCLOSURE

Safety razors are described each employing an endless band blade which is moved between sets of sharpening elements each time the blade is advanced to locate a fresh, sharpened portion at a cutting position. Each razor is provided with an alternately retracting and advancing pressure plate and shield plate. The pressure plate holds the blade in position for cutting. The shield plate covers the cutting portion of the blade while the blade is being advanced and sharpened. One razor employs a rotating ring to advance the blade and an independently operable cam alternately retracts and advances the pressure plate and shield plate. Another razor employs a crank to advance the blade. The crank is revolvable to retract and advance the pressure plate and shield plate alternately.

---

The invention relates to the art of safety razors and more particularly concerns safety razors of the type which employ endless band blades.

Prior safety razors of this type of which the one shown in U.S. Pat. No. 1,713,079 is typical have provisions for sharpening the blade as it is advanced. However no provision is made for covering and protecting the cutting edge portion of the blade while it is being advanced. Also there is no way of knowing whether a sharp or dull portion of the blade is located at cutting position, nor of indicating just how far the blade is to be advanced to properly locate a sharp portion at cutting position.

The present invention is directed at overcoming the above and other deficiencies of prior safety razors of this general type, by means of one razor structure which employs a manually turnable ring to advance the blade to a new cutting position and while the blade is being sharpened.

An independently operable cam is used to advance a shield plate for protecting the cutting edge of the blade. The cam also retracts a pressure plate which holds the blade in cutting position. At the same time the shield plate actuates a slide bar to release the ring so that it can be turned to advance the blade. When the cam is revolved to retract the shield plate the slide bar engages the ring so that the blade cannot be displaced while in cutting position, and the pressure plate is returned to blade holding position.

In another form of the invention, a crank turns a ring which advances the blade while being sharpened. The crank is normally held in a stationary position. When the crank is moved to operative position it operates a linkage mechanism to advance a shield plate and retract a pressure plate. While the crank is being revolved back to its original stationary position, the pressure plate is advanced to blade holding position and shield plate is retracted. When the crank is back in its stationary non-rotatable position the rotatable ring and blade are prevented from moving.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 1 is a perspective view showing one side of one safety razor embodying the invention, the razor being shown with shield plate retracted and pressure plate advanced and holding the blade in cutting position.

FIG. 2 is an end view of the razor of FIG. 1.

FIG. 3 is a reduced perspective view of the razor showing the other side thereof and the manner in which it is held and operated for advancing the blade.

FIG. 4 is a plan view of part of the razor showing the shield plate in advanced position covering the cutting edge of the blade.

FIG. 5 is a perspective view of the razor with cover plate and shield plate removed to show internal construction, the shield plate being indicated by dot and dash lines.

FIG. 6 is an enlarged sectional view taken on line 6—6 of FIG. 2, showing details of the blade and sharpening elements.

FIG. 7 is an exploded perspective view of parts of the safety razor.

FIG. 8 is a perspective view of a second safety razor showing pressure plate advanced and shield plate retracted.

FIG. 9 is a perspective view of the second safety razor of FIG. 8 showing shield plate advanced and crank partially swung.

FIG. 10 is a perspective view of the second safety razor in an inverted position showing crank fully revolved in position for turning.

FIG. 11 is a perspective view of the second safety razor with cover plate removed.

Figure 12:
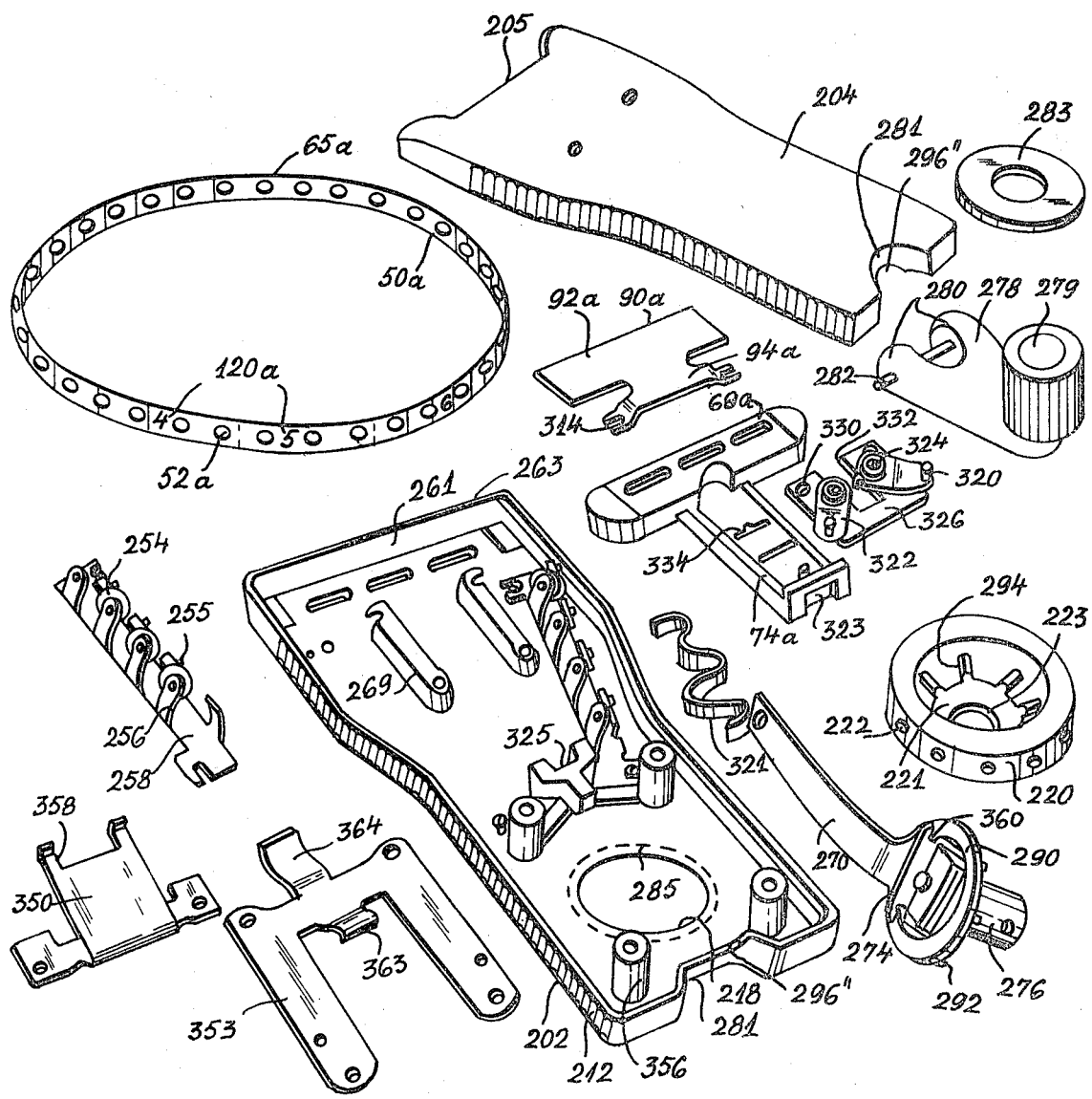
FIG. 12 is an exploded perspective view of parts of the second safety razor.

Referring first to FIGS. 1-7, there is shown safety razor 25 having a rather elongated flat casing 22 including a base 24 and cover plate 26. The base and cover plate are secured together by screws 28 inserted through holes 30 in the cover plate and engaged in threaded holes in posts 31. Lateral narrow sides of the base and cover have ribs or corrugations 33 to provide a good hand grip on the casing. The casing has a narrower end 32 which serves as a handle and a wider end 34 which serves as a head.

In the base 25 is a hole 36 in which is rotatably fitted on end of cylindrical ring 38. The ring is formed with internal ribs or knurls 40 to facilitate grasping and turning the ring with respect to the casing. The other end of the ring fits in a hole 42 in the cover plate 26. A shoulder 44 formed on the ring rotatable abuts the inner side of the cover plate.

A plurality of pins 45 extend radially outward of the ring in uniformly spaced circumferential array. The pins engage an endless band blade 50 entrained around the ring. The blade has spaced holes 52 which receive pins 45. The blade is threaded between sharpening elements 54 located near both lateral sides of the casing. The sharpening elements are secured to spring fingers 56 alternately disposed and opposing each other on opposite sides of the blades which extends between them. The spring fingers are integral portions of channel shaped spring members 58 secured at their ends by screws 59 to the inner side of the base 24.

The head end 34 of the casing has an opening 60 in which is secured a comb plate or shaving head 62 formed with teeth 64 to tension the skin and position the user's hairs for cutting. The blade 50 extends along the inner side of the shaving head. The cutting edge 65 of the blade is exposed just beyond the free edge of the shaving head.

A T-shaped pressure plate 68 has a cross bar 69 which backs up the cutting section of the blade at the shaving head and presses it against the shaving head. Pressure plate 68 has shank 74 integral with cross bar 69. The pressure plate is retractable by a cam 70 which has an eccentric cam knob 76 at one side engaged in rectangular hole 78 in shank 74. The shank of the pressure plate is slidably disposed in a wide slot 77 formed in a guide plate 79 at the inner side of base 24.

The cam is rotated by a knob 80 rotatably fitted in a hole 82 in base 24. The cam has a stub shaft 81 engaged in slot 83 of knob 80, and held by the spring-loaded screw 84. Knob 80 has an outside raised portion 85 which can be grasped for turning the knob. When the knob is turned the pressure plate is alternately advanced against and retracted from the inner side of the cutting section 50' of blade 50 at shaving head 62.

A shield plate 90 is slidably disposed over ends 69' of the pressure plate and moves oppositely from the pressure plate to cover the cutting edge of the section 50' of the blade when the pressure plate is retracted from this blade section. Shield plate 90 is generally T-shaped with a crosshead 92 and shank 94. The crosshead 92 is exposed at the open end of the casing just beyond the end of cover plate 26; see FIGS. 1 and 4. The shank 94 has a slot 96 in which is received eccentric cam knob 98 located on the other side of cam 70 in a position diametrically opposite from cam knob 76. When the cam is rotated cam knob 76 advances and retracts the pressure plate with respect to blade section 50' while the cam knob simultaneously retracts and advances the shield plate 90. At its distal end, shank 94 has a flange 100 which engages upstanding foot 102 of L-shaped slide bar 104. Bar 104 is slidably disposed between spaced guide rails 106 on the inner side of base 24. A coil spring 108 is engaged at one end on a projection 110 formed on the periphery of stationary guide plate 79. The other end of coil spring 108 engages on a projection 109 formed on the outer side of the foot 102 of the slide bar 104. The free end of bar 104 is formed with teeth 112 which can engage with teeth 114 formed on an annular circumferential flange 116 integral with ring 38.

It will be apparent that when shield plate 90 is advanced to cover and protect section 50' of blade 50, then slide bar 104 is pulled forwardly also, by engagement of flange 100 with foot 102 so that teeth 112 are disengaged from teeth 114 of ring 38 while coil spring 108 is compressed. This permits the ring to be turned for advancing the blade to dispose a fresh, sharp portion of the blade at the cutting position in head end 34. When the shield plate 90 is retracted by cam 70, then flange 100 is disengaged from foot 102 so that spring 108 can expand and push the slide bar 104 toward ring 38 until teeth 112 again engage with teeth 114.

When ring 38 is turned the blade 50 moves along guided by stationary posts 31 and by projections 115 in base 24. The blade is sharpened as it passes between the two sets of spring biased sharpening elements 54 at opposite lateral sides of the casing.

By the arrangement described, turning of knob 80 disposes knob portion 85 longitudinally of the casing with index mark 85' closest to the head end 34, retracts shield plate 90 and extends pressure plate 68. This causes the slide bar 104 to lock ring 38 against rotation, and the blade section 50' is exposed and held by the pressure plate 68. When the knob 80 is rotated 180°, then the pressure plate 68 is fully retracted while the shield plate is extended in the position shown in FIG. 4. The ring 38 is released by the retracted slide bar 104 and is free to turn as indicated in FIG. 3 for sharpening the blade and for advancing a fresh sharpened portion of the blade into cutting position. The blade can be provided with numbers 120 marked in sequence thereon at equally spaced intervals. These numbers will be visible through an opening 111 formed in end wall 113 of the casing; see FIG. 2. When one of these numbers is centered at opening 111, then a sharpened portion of the blade is correctly positioned in cutting position at the head end 34.

The slide bar 104 serves as a safety lock to prevent inadvertent advance of the blade 50 while in use when shield plate 90 is retracted. The shield plate 90 serves to cover and protect the blade and fingers of the user while the blade is being advanced and sharpened.

In FIGS. 8–12, there is shown a second safety razor 25a embodying another form of the invention. Razor 25 has an elongated flat casing 200 including a base 202 and cover plate 204. The base and cover plate are secured together by screws inserted through holes 208 in the cover plate and engaged in threaded holes in the base or by any other suitable means. The base and cover have ribs or corrugations 212 at lateral narrow sides of the base and cover to provide a good hand grip. The casing has narrower end 214 which serves as a handle and wider end 216 which serves as a head.

In the base is a hole 218 over which is rotatably disposed a cup shaped ring 220 having a circular end portion 221 with central hole 223; see FIG. 12. The ring carries a plurality of pins 222 which extend radially outward of the ring in uniformly spaced circumferential array. The pins engages an endless band blade 50a entrained around the ring. The blade had spaced holes 52a which receives the pins. The blade is threaded between rotatable, spring biased sharpening discs 254 located near both lateral sides of the casing. The discs are rotatably secured by pins 255 to spring fingers 256 alternately disposed and opposing each other on opposite sides of the blade which extends between them. The spring fingers are integral portions of spring members 258 secured at their ends by screws 259 to the inner side of base 202.

The wider end of the base 202 is formed with an end wall 261. The cutting section 50a' of blade 50a extends along the inner side of wall 261 and the cutting edge 65a of the blade is exposed just beyond the edge 263 of wall 261. Cover plate 204 has a recess 205 defining an opening in the head of the casing at which the cutting edge 65a of the blade is exposed. A retractable T-shaped pressure plate 68a is formed with a cross bar 69a which bears against the inner side of cutting section 50a' of the blade 50a to hold it in cutting position. The pressure plate has a shank 74a slidably disposed between stationary guide rails 269 on the inner side of the base 202.

As in razor 25, the pressure plate 68a is retracted when the blade is being advanced and sharpened. The pressure plate is retracted by a long leaf spring 270 secured at one end by a screw 272 to the distal end of shank 74a of the pressure plate.

The other end of leaf spring 270 is secured to a clamping member 274 mounted at one end of a sleeve shaft 276. having a handle 279 at one end and spaced lever arms 280 engaged by a pin 282 with the outer end of shaft 276. Handle 279 engages in a notch 281 at end 298 of the casing. The crank can be pivoted on pin 282 while lever arms 280 rotatably bear against pressure ring 283 fitted on an annular seat 285 around hole 218. Thus when the crank is swung in the direction indicated by arrow 284 in FIG. 9 to the position shown in FIG. 10, the shaft 276 is retracted to maximum extent and along with it the leaf spring 270 and pusher or pressure plate 68a to disenage cutting section 50a' of blade 50a.

The crank can be turned on the axis of ring 220 when in the position shown in FIG. 10 to advance the endless band blade 50a. This is accomplished by a cup shaped member 290 which is secured to or integral with shaft 276. Member 290 has radial ridges 294 formed inside of the circular end portion or wall 221 of ring 220. Thus turning of the crank, shaft 276, member 290 and ring 220 causes the blade 50a to advance in one direction. An opening 296 can be provided at end 298 of the case. The opening defined by recesses 296′, 296″ formed in end walls of both the base and cover plate expose numbers 120a marked on the outerside of the blade. The numbers at opening 296 will indicate which section of the blade is centered at the head in proper cutting position.

In order to protect the cutting edge of the blade when the pressure plate is retracted to release the blade for movement, there is provided a movable shield plate 90a. This plate has a wide cross bar 92a portion which is exposed at recess 205 of the cover plate. The shield plate overlays the cross bar 69a of the pressure plate. A pair of notches 314 are formed at one end of the shank 94a of the generally T-shaped shield plate. The notches 314 engage pins 320 carried by levers 322. The levers pivot on screw pins 324 set in a U-shaped plate 326 secured by screws 328 engaged in screw holes 330 at ends of guide rails 296. Ends of levers 322 are provided with fingers 332 which engage in slot 334 formed in shank 94a. When the shield plate 90a is retracted, the levers 322 turn outwardly oppositely and the ends holding pins 320 move forwardly to advance the shield plate over the cutting end of section 50a′ of the blade. A sinuous leaf spring 321 is located between end 323 of shank 74a and an abutment 325 inside base 202. This spring is compressed when the pressure plate is retracted.

It will be understood that the pressure plate is retracted at the same time that the shield plate is being advanced while the crank is being turned on pin 282. While the crank is being turned the endless blade 50a is being advanced and two portions are being simultaneously sharpened by freely rotatable sets of sharpening discs 254. After the blade is sufficiently advanced to locate a sharpened portion at the cutting position in head end 216, the shield plate 90a is retracted to expose the cutting section 50a′ of the blade and the pressure plate is advanced to section against end wall 261. This is done by swinging crank 278 on pin 282 angularly through 180°. Then the crank handle 279 will be engaged in notch 281 defined at the end 298 of the casing so that the handle cannot be turned to turn ring 220. While the crank is being turned from the position shown in FIG. 8 to the position shown in FIG. 10, shaft 276 moves axially inward and leaf spring 270 moves forwardly to advance the pusher plate. At the same time compressed spring 321 expends to hold the pressure plate in pressure engagement with cutting section 50a′ of the blade.

Another leaf spring 350 is mounted by screws 352 on a rectangular U-shaped plate 353 secured by screws 354 in posts 356. Leaf spring 350 has fingers 358 engaged with notches 360 formed in lateral edges of clamping member 274. Leaf spring 350 applies upward on inward tension to shaft 276 and tends to prevent axial movement of the shaft except when the crank handle is firmly grasped and the crank is turned on pin 282. A bent finger 363 at the bight of plate 353 serves as an inner stop for the notched end of leaf spring 350. A tongue 364 formed on the bight of plate 353 extends over the end of spring 321 and stabilizes this end at abutment 325. Tongue 364 is located under spring 270.

By the arrangement described, the pressure plate will be advanced when the crank is revolved on pin 282 to the engaged position shown in FIG. 8. The crank is revolved on an axis perpendicular to the axis of ring 220. While the crank is being revolved the levers 322 turn rearwardly and retract the shield plate. The wide cross bar 92a of the shield plate is engaged in a shallow groove 370 formed in the cross bar 69a of the pressure plate so that the shield plate is prevented from lateral displacement while being held by pins 320 in both retracted and extended positions.

It will be noted that both razors 25 and 25a have alternately retracting and advancing pressure plates and shield plates. Both have multiple blade sharpening members on opposite lateral sides of the casing. Razor 25 has the advantage of somewhat simpler construction, but has a knob which advances and retracts the shield plate and pressure plate and the ring which advances the blade must be operated in succession by different manual movements. In razor 25a the structure is more complex, but the shield plate and pressure plate automatically advance and retract when the crank which advances the blade is revolved between rotatable and nonrotatable positions.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. A safety razor comprising a hollow elongated casing defining a narrow handle at one end and a wider head at the other end, said head having an opening at said other end of the casing; and endless band blade having a continuous cutting edge, said blade having a cutting section exposed at said opening in the head; means for advancing the blade to expose successive sharp cutting sections thereof at said opening; a movable shield in the casing; and means for moving the shield at said opening to cover the exposed cutting section of the blade while the blade is being advanced.

2. A safety razor as defined by claim 1, further comprising a movable pressure member in said head disposed to hold the cutting section in stationary cutting position when the pressure member is advanced at said opening; and a mechanism engaging both the pressure member and shield for advancing the shield while retracting the pressure member and for retracting the shield while advancing the pressure member.

3. A safety razor as defined by claim 2, wherein said mechanism further includes means for preventing the blade from advancing while the shield is retracted and the pressure member is advanced.

4. A safety razor as defined by claim 1, wherein means for advancing the blade comprises a ring in the handle of the casing, said blade being entrained on ring, said handle having lateral openings with said ring journaled in said lateral openings for manual engagement and turning to advance the blade.

5. A safety razor as defined by claim 4, further comprising a movable pressure member in said head disposed to hold the cutting section of the blade in the stationary cutting position when the pressure plate is advanced at said opening; said means for moving the shield comprising a cam mechanism engaging both the pressure member and shield for advancing the shield while retracting the pressure member and for retracting the shield while advancing the pressure member.

6. A safety razor as defined by claim 5, further comprising a ring engaging device actuated by said cam mechanism to prevent the ring from turning and advancing the blade while the shield is retracted and pressure member is advanced.

7. A safety razor as defined by claim 1, wherein the means for advancing the blade comprises a ring in the handle of the casing, said blade being entrained on said ring; and a crank operatively engaged with said ring to turn the same for advancing the blade when the crank is rotated on the axis of the ring, said means for moving the shield comprising lever means operatively interconnecting the shield and crank and actuated by the crank when the crank is revolved on an axis perpendicular to its axis of rotation.

8. A safety razor as defined by claim 7, further comprising a movable pressure member in said head disposed to hold the cutting section of the blade in stationary cutting position when the pressure plate is advanced at said opening, said lever means further interconnecting the pusher member and crank for advancing the shield while retracting the pressure member and for retracting the shield while advancing the pressure member.

9. A safety razor as defined by claim 1, further comprising two sets of spring fingers supporting sharpening elements, said sharpening elements engaging two sections of the blade at opposite lateral sides of the casing for sharpening the blade while it is being advanced.

10. A safety razor as defined by claim 1, wherein said sharpening elements are freely rotatable discs.

References Cited

UNITED STATES PATENTS 2,661,530   12/1953   Cavanagh _____ 30—40.1

ROBERT C. RIORDON, Primary examiner

G. F. GRAFL, Assistant Examiner